Patented Sept. 8, 1936

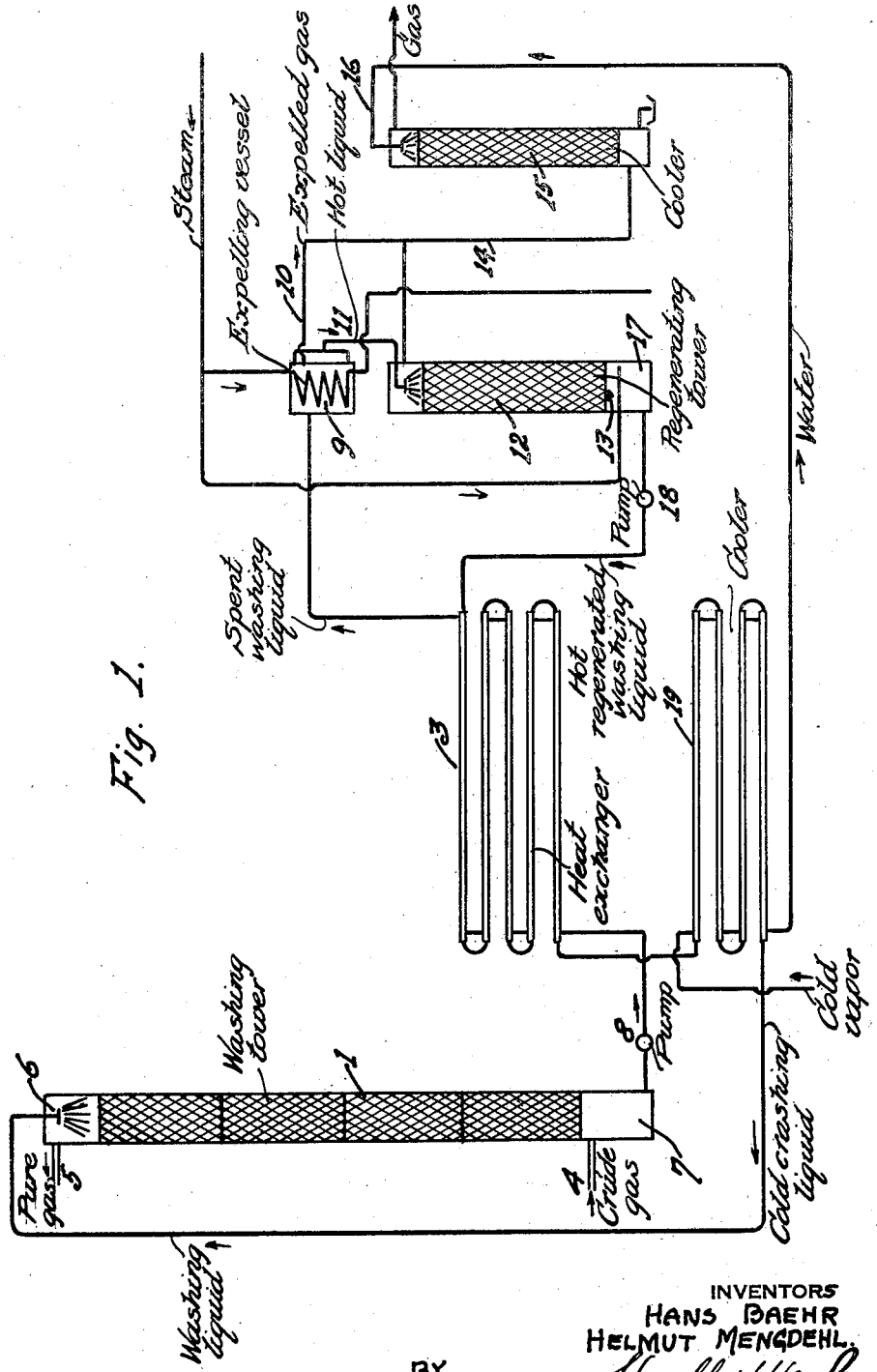

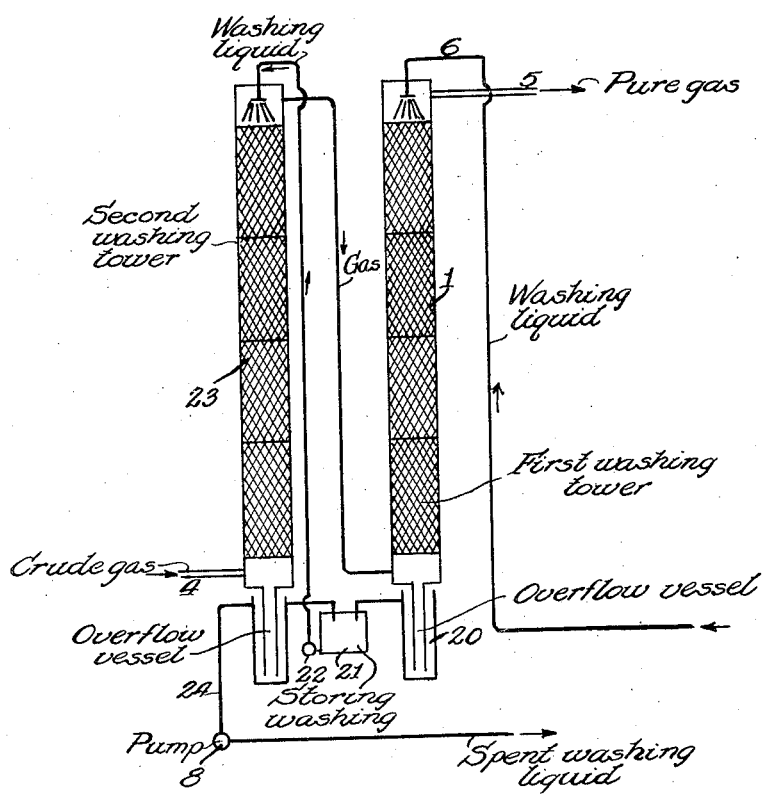

2,053,650

UNITED STATES PATENT OFFICE 2,053,650

SEPARATION OF CARBON DIOXIDE FROM GASEOUS MIXTURES FREE FROM SULPHUR COMPOUNDS

Hans Baehr and Helmut Mengdehl, Ludwigshafen-on-the-Rhine, Germany, assignors to I. G. Farbenindustrie Aktiengesellschaft, Frankfort-on-the-Main, Germany Application June 18, 1932, Serial No. 618,082
In Germany June 20, 1931

11 Claims. (Cl. 23—2)

The present invention relates to improvements in the separation of carbon dioxide from gaseous mixtures containing the same, but which are free from sulphur compounds, by means of a scrubbing process in which the carbon dioxide is absorbed in a scrubbing medium which is then regenerated for further use, the carbon dioxide being recovered therefrom.

It is already known that carbon dioxide may be recovered from gases containing the same, as for example from gases obtained by the catalytic conversion of gaseous hydrocarbons by the action of steam, by washing the gases with organic bases such as diethanolamine and tri-ethanolamine and expelling the carbon dioxide from the said bases by heating. This process has the drawback that on account of the high vapor tension of the washing liquid enriched in carbon dioxide a complete washing out of the carbon dioxide from the gas is very difficult. Moreover, the organic bases are volatile, and therefore losses, which have a considerable influence on the economy of the process, are incurred both in washing the gases and in expelling the carbon dioxide.

We have now found that gases containing carbon dioxide and which may also contain other weak gaseous or vaporous (hereinafter referred to as "vaporized") acids but which are free from sulphur and its compounds can readily be freed from the carbon dioxide and other vaporized acids if such are present, by scrubbing the gases with aqueous liquids which contain organic acids in combination with alkalies, said liquids being passed through a circulatory system in which after contact with said gases they are freed from the carbon dioxide, and, if desired, also from the other weak vaporized acids if such are present, thus reconverted into their original state and then again brought into contact with the gases to be washed. The alkalies may also be present in the form of their salts with the said organic acids. The weak vaporized acids can be expelled from these liquids having an alkaline reaction by heat, whereby they are recovered in a concentrated form and may be easily worked up in any desired manner.

The nature of the organic acids employed depends on the strength of the weak vaporized acids which, besides carbon dioxide, are to be removed, and, generally speaking, the electrolytic dissociation of the organic acids in the cold should be about the same as, or rather slightly less than, that of the weak acid to be recovered. The dissociation in the warm should be greater than that of the vaporized acid to be recovered, so that the latter is expelled on heating. Besides the electrolytic dissociation the low degree of volatility of the organic acids compared with the volatility of the absorbed vaporized acids also makes them suitable for expelling the latter while heating. The following organic acids may be mentioned by way of example: amino-sulphonic acids, such as amino benzene-sulphonic and amino naphthalene-sulphonic acid, taurine, other amino acids, such as glycocoll, alanine, anthranilic acid and its derivatives such as acetylanthranilic acid, nitro- and chlorobenzoic acid, aromatic carboxylic acids, phthalic acid and its derivatives, weak aliphatic mono- and dicarboxylic acids or imino acids, such as imino di-propionic acid. The hydroxides, oxides, carbonates, and the like, of sodium, potassium, lithium, may serve as the bases. The sodium and potassium salts of glycocoll, aspartic acid, and acetylanthranilic acid are especially suitable. Mixtures of several of the said organic acids may also be employed. These aqueous liquids at ordinary temperature and pressure, depending on the concentration therein of the dissolved substances, absorb up to more than sixty times their volume of carbon dioxide and when heated give it up again practically completely. In order to avoid the formation of precipitates in the washing solutions enriched with the weak vaporized acids, in particular with carbon dioxide, it is preferable to maintain a nearly equivalent ratio of the amounts of organic acids on the one hand and of the alkalies on the other hand.

It is of advantage to employ mixtures of several alkali metal salts of weak organic acids since in this manner the formation of precipitates in the washing liquid, such as takes place, for example, when absorbing carbon dioxide in a highly concentrated solution of the sodium salt of alanine, is avoided. In this manner not only the premature formation of a precipitate in the washing liquid is prevented but also the speed of absorption is enhanced. It is of particular advantage to employ mixtures of such of the aforesaid substances, of which the single constituents are homologues, or mixtures of one or more amino fatty acids with one or more imino fatty acids, or mixtures of amino acids obtained by the degradation of albumen by fermentation or by the action of acid or basic substances.

The results obtained when washing out the aforesaid weak acids, are considerably enhanced when the washing treatment is carried out at elevated temperatures which, however, should preferably not be higher than 90° C. At elevated temperatures the speed of the hydration of the carbon dioxide which materially influences the speed of absorption, is considerably higher than at ordinary temperatures. The vapor tension of the weak vaporized acids, in particular of the carbon dioxide, in the washing liquid enriched therewith, on the other hand, rises only slowly when elevating the temperature and strongly increases only in the neighbourhood of the boiling point of the washing liquid.

When employing strongly concentrated washing liquids of the nature described, solid salts formed from the weak vaporized acids and the alkalies or alkaline earths are liable to be precipitated when the liquids are allowed to stand for a considerable time after the saturation with carbon dioxide. These precipitates may easily give rise to disturbances in the operation such as clogging up of the apparatus and also to change of the composition of the washing liquid. When the washing solutions are low in alkalies the capacity of absorption of the latter diminishes. These inconveniences can be avoided if the absorption liquid is kept in circulation between one or more washing towers and one or more regenerators, cooling devices being arranged at suitable places in the circulatory system. When proceeding in this manner the time during which the washing liquid is in the washing towers is not sufficient for the formation of solid precipitates and if these are formed they have no chance of depositing since they are immediately carried off by the washing liquid into the regenerator in which they are decomposed. To this end it is preferable to adjust and arrange the containers balancing the level of the liquids in the towers and which are necessary for continuously carrying on the operation, in such a manner that the liquid as far as possible remains in perpetual movement. For this purpose it is of advantage to employ as regenerating apparatus columns in which the prewarmed solution is allowed to trickle down and is contacted with steam passed in counter-current thereto, the solution thus remaining in perpetual movement.

Apart from the danger of precipitation of solid salts it is preferable to employ strongly concentrated washing liquids since with these a considerably more rapid absorption of the vaporized weak acids is attained.

The present invention will now be further described with reference to the accompanying drawings of which Figure 1 shows in somewhat diagrammatic manner an elevation, partly in section, of an apparatus in which the washing treatment may be carried out with particular advantage. Figure 2 shows a particular arrangement in which the gases to be purified are successively washed in two washing towers. It is, however, to be understood that the invention is not restricted to the use of the particular arrangements shown in these drawings.

The most important parts of the apparatus shown in the said Figure 1 are the washing tower 1, the devices 12 and 9 for regenerating the washing liquid, the heat exchanger 3 and the requisite pipes and connections for the passage of the gas, the washing liquid, the water and the steam.

The gas to be purified is introduced into the washing tower 1 at 4 and leaves the tower at 5. The said tower is preferably lined with ceramic material and filled with Raschig rings. The washing liquid is introduced into the tower through a spraying device 6 and, after absorbing during its passage downwards through the tower the weak vaporized acids contained in the gas to be purified, it collects at the bottom 7 of the tower from which it is conveyed by means of a pump 8 through a heat exchanger 3 into the expelling vessel 9. In the heat exchanger the washing liquid is heated to about 80° C. and in vessel 9 it is heated to boiling, the greatest part of the absorbed weak vaporized acid thereby being expelled and escaping through pipe 10. The hot washing liquid overflowing at 11 is brought into a tower 12 preferably lined with ceramic material and filled with Raschig rings in which said liquid is brought into direct contact with steam introduced at 13. In this manner the washing liquid is freed practically completely from the absorbed weak vaporized acids. These weak acids escaping together with the steam are combined at 14 with those drawn off from the expelling vessel 9 and then freed from the steam by direct contact with cold water, supplied from 16, in cooler 15. The weak vaporized acids freed from steam may then be further worked up in any desired manner. The hot washing liquid collecting at the bottom 17 of tower 12 is then passed by means of pump 18 through the heat exchanger 3 and thereupon through the cooler 19 in which the said liquid is brought to the temperature which it should have in the washing operation in washing tower 1 to which it is recycled.

The arrangement described has the advantage that the solution is kept in perpetual movement so that a precipitation of solid salts either does not occur at all or, if it does occur, no solid salt is deposited at any part of the apparatus. Furthermore, in this operation large amounts of gas can be purified with small amounts of washing liquid which makes possible a saving of the steam for expelling the absorbed gas. Moreover, the expenses for constructing the regenerator system described are relatively small.

The washing out of the weak vaporized acids which are absorbed more slowly by the washing liquid is preferably effected in two washing towers arranged in series as is shown for example in Figure 2 of the accompanying drawings. According to this modification the regenerated washing liquid is introduced into the first washing tower by means of a spraying device 6 and after passage through this tower it collects in an overflow vessel 20 and is then directed to storing vessel 21. From thence the washing liquid is conveyed by means of pump 22 into the second washing tower 23. After passage through this tower part of the washing liquid flows back into the storing vessel 21 and thus is brought again into washing tower 23, while depending on the conditions of the washing treatment, another part of the washing liquid is pumped by means of pump 8 through pipe 24 and then treated in a regenerating system similarly as described with reference to Figure 1. This arrangement involves the advantage that the washing liquid corresponding to the amount passed through the first washing tower is enriched to a great extent with the weak vaporized acids to be absorbed and that by this t..: absorptive capacity of the washing liquid is fully made use of. In this manner a considerable saving of the steam with reference to the amount of gas to be treated is attained.

It it known that alkaline liquids strongly corrode lead and aluminium but attack iron only slightly. Contrary to expectation we have found that by the above mentioned alkaline washing liquids for removing weak vaporized acids from gases iron is considerably attacked but that lead, in particular hard lead, chromium-nickel steel, aluminium are not or at the most only slightly corroded. The stability of these metals may be increased by the addition of a small amount of divalent sulphur compounds such as hydrogen sulphide, ammonium sulphide, ammonium polysulphide and the like to the washing liquid or to the gas before the washing treatment. It has been found that in the presence of the said sulphur compounds the attack of the washing liquid can be completely avoided so that even iron may be employed as constructional material. It is also of advantage to avoid the presence of chlorine in any form, as for example in the form of sodium chloride, since otherwise the walls of the vessels coming into contact with the solution having a basic reaction are very liable of being corroded, especially if the vessels are constructed of iron. Thus for example, when preparing the amino-acid from halogenated fatty acids, such as chloroacetic acid, products are formed which cannot be made use of as such. They are preferably purified before use. However, it is preferable to start from agents free from chlorine when producing the agents to be used for the preparation of the washing liquids. Lead, aluminium and V2A-steel are more stable, in particular if hydrogen sulphide is present in the gas to be purified, but they are also corroded after some time.

Examples of industrial gases which can be purified according to the present invention are gases containing hydrogen which have been obtained by catalytic conversion of purified water gas with steam, or cracking gases which have been catalytically converted with steam, or illuminating gas, or gas which is obtained by gasifying coal with oxygen, freeing the resulting gas from sulphur and its compounds, and converting the thus purified gas with steam in the presence of a catalyst. These gases often contain not only carbon dioxide, but also other weak vaporized acids, of which hydrocyanic acid is perhaps the most typical example.

The advantage of the process according to the present invention over that already known is that the organic compounds employed in the absorption liquor are present in a non-volatile form, so that no losses are incurred during the absorption and expelling of the weak vaporized acids. Moreover, these weak acids are expelled in a very short time by heating, so that only a small application of heat is needed.

The following examples will further illustrate the nature of the said invention but the invention is not restricted thereto.

Example 1

An aqueous solution containing 400 grams of sodium glycocoll per litre is caused to trickle in counter-current at room temperature and under atmospheric pressure in a washer through a mixture of nitrogen and hydrogen, containing 20 per cent by volume of carbon dioxide, which has been prepared from water gas. About 10 liters of the absorption liquor are employed per cubic meter of gas. The gas leaving the washer contains less than 0.2 per cent of carbon dioxide. The liquor leaving the washer is heated to the boiling point by means of heat exchange with absorption liquors from which the absorbed gas has previously been expelled. Practically the whole of the absorbed carbon dioxide is expelled. Since the liquor absorbs part of the water always contained in the gas, only part of the water obtained by condensation of the amount evaporated during the heating of the liquor is added again to the liquor so that a constant concentration of the liquor is maintained. The liquor is then cooled and employed again for the purification of gases. The carbon dioxide escaping from the expelling device may be compressed after condensation of the steam by cooling and filled into bottles of steel.

Example 2

An aqueous solution containing 30 per cent of sodium alanine and 8 per cent of potassium glycocoll is caused to trickle in counter-current through a mixture of nitrogen and hydrogen, containing about 20 per cent by volume of carbon dioxide, prepared from water gas. The gas treated thus contains less than 1 per cent of carbon dioxide. The liquor leaving the washer is regenerated as described in Example 1 and employed again. The carbon dioxide removed from the gas may be employed for the preparation of dry ice.

Example 3

An aqueous solution containing a mixture of 15 per cent of sodium alanine, 5 per cent of sodium imino-dipropionate, 5 per cent of sodium glycocoll and 5 per cent of sodium iminoacetate is caused to trickle at a temperature of 65° C. through a gas obtained by cracking hydrocarbons which have been catalytically converted by the action of steam to a gas mixture containing 20 per cent of carbon dioxide. This treatment is effected in two washing towers arranged in series. In the second tower 5 litres of washing liquid are employed per each cubic meter of gas while the solution passing from the second tower to the first tower is repeatedly recycled in the latter so that about 28 litres of solution are used per cubic meter. From the first tower the same amount as supplied to the second tower is removed and heated to boiling whereby the absorbed carbon dioxide escapes practically completely. The gas leaving the second washing tower contains less than 0.5 per cent of carbon dioxide.

As has been set forth above, the process according to the present invention is applicable to gases which are free from sulphur compounds. The treatment of gases which contain compounds of sulphur forms the subject-matter of a co-pending application Serial No. 618,081.

What we claim is:—

1. A process for the separation of carbon dioxide from a gas free from sulphur and its compounds which comprises washing said gas with an aqueous liquid containing an alkali in combination with an about equivalent amount of an organic acid of which the electrolytic dissociation in the cold does not substantially exceed that of carbon dioxide, whereby the carbon dioxide contained in said gas is absorbed by said liquid, continuously withdrawing from contact with said gas liquid containing the absorbed carbon dioxide, then expelling the absorbed carbon dioxide from this liquid and washing a fresh amount of gas with the latter.

2. A process for the separation of carbon dioxide from a gas free from sulphur and its compounds which comprises washing said gas with an aqueous liquid containing an alkali in combination with an about equivalent amount of an organic acid of which the electrolytic dissociation in the cold does not substantially exceed that of carbon dioxide, whereby the carbon dioxide contained in said gas is absorbed by said liquid, continuously withdrawing from contact with said gas liquid containing the absorbed carbon dioxide, then expelling the absorbed carbon dioxide from this liquid and washing a fresh amount of gas with the latter, the entire liquid being kept in constant movement.

3. A process for the separation of carbon dioxide from a gas free from sulphur and its compounds which comprises washing said gas with an aqueous liquid containing an alkali in combination with an about equivalent amount of an organic acid selected from the group consisting of amino acids and derivatives thereof, whereby the carbon dioxide contained in said gas is absorbed by said liquid, continuously withdrawing from contact with said gas liquid containing the absorbed carbon dioxide, then expelling the absorbed carbon dioxide from this liquid and washing a fresh amount of gas with the latter.

4. A process for the separation of carbon dioxide from a gas free from sulphur and its compounds which comprises washing said gas at ordinary temperatures with an aqueous liquid containing an alkali in combination with an about equivalent amount of an organic acid of which the electrolytic dissociation in the cold does not substantially exceed that of carbon dioxide, whereby the carbon dioxide contained in said gas is absorbed by said liquid, continuously withdrawing from contact with the said gas liquid containing the absorbed carbon dioxide, then expelling at an elevated temperature the absorbed carbon dioxide from this liquid and washing a fresh amount of gas with the latter.

5. A process for the separation of carbon dioxide from a gas free from sulphur and its compounds which comprises washing said gas with an aqueous liquid containing an alkali in combination with an about equivalent amount of an organic acid of which the electrolytic dissociation in the cold does not substantially exceed that of carbon dioxide, whereby the carbon dioxide contained in said gas is absorbed by said liquid continuously withdrawing from contact with the said gas liquid containing the absorbed carbon dioxide, then expelling by indirect heat exchange with a hot liquid the absorbed carbon dioxide from this liquid and washing a fresh amount of gas with the latter.

6. A process for the separation of carbon dioxide from a gas free from sulphur and its compounds which comprises washing said gas with an aqueous liquid containing an alkali in combination with an about equivalent amount of an organic acid of which the electrolytic dissociation in the cold does not substantially exceed that of carbon dioxide, whereby the carbon dioxide contained in said gas is absorbed by said liquid, continuously withdrawing from contact with the said gas liquid containing the absorbed carbon dioxide, then expelling by direct contact with steam the absorbed carbon dioxide from this liquid and washing a fresh amount of gas with the latter.

7. A process for the separation of carbon dioxide from a gas free from sulphur and its compounds which comprises washing said gas with an aqueous liquid containing an alkali in combination with an about equivalent amount of an organic acid of which the electrolytic dissociation in the cold does not substantially exceed that of carbon dioxide, whereby the carbon dioxide contained in said gas is absorbed by said liquid, continuously withdrawing from contact with said gas liquid containing the absorbed carbon dioxide, then expelling the absorbed carbon dioxide from this liquid and washing a fresh amount of gas with the latter, while keeping the said gas and the said liquid free from substances comprising chlorine.

8. A process for the separation of carbon dioxide and another weak vaporized acid from a gas free from sulphur and its compounds which comprises washing said gas with an aqueous liquid containing an alkali in combination with an about equivalent amount of an organic acid, of which the electrolytic dissociation in the cold does not substantially exceed that of carbon dioxide and of said other weak vaporized acid, whereby the carbon dioxide and said other weak vaporized acid contained in said gas is absorbed by said liquid, continuously withdrawing from contact with said gas liquid containing the absorbed carbon dioxide and said other weak vaporized acid, then expelling the absorbed carbon dioxide and said other weak vaporized acid from this liquid and washing a fresh amount of gas with the latter.

9. The process of claim 1 in which the organic acid is an amino carboxylic acid.

10. The process of claim 1 in which the organic acid is an aliphatic amino carboxylic acid.

11. The process of claim 1 in which the organic acid is an amino derivative of a lower aliphatic carboxylic acid selected from the group consisting of acetic and propionic acids.

HANS BAEHR.
HELMUT MENGDEHL.